United States Patent [19]

Boyles et al.

[11] Patent Number: 4,640,528
[45] Date of Patent: Feb. 3, 1987

[54] TORSION-ABSORBING HIGHWAY SEMITRAILER

[75] Inventors: William C. Boyles, Osteen, Fla.; Douglas R. Hagge, Columbus; Clifford V. Johnston, Hebron, both of Ohio

[73] Assignee: Cardinal Industries, Inc., Columbus, Ohio

[21] Appl. No.: 760,595

[22] Filed: Jul. 30, 1985

[51] Int. Cl.$^4$ ............................................. B62D 21/14
[52] U.S. Cl. ................................. 280/789; 280/423 R
[58] Field of Search .......................... 280/789, 795, 638; 296/10, 159, 168; 80/423 R, 467, 482, 491 R, 491 D, 638

[56] References Cited

U.S. PATENT DOCUMENTS

| | | | |
|---|---|---|---|
| 3,105,701 | 10/1963 | Schilberg | 280/790 |
| 3,321,214 | 5/1967 | Tantlinger | 280/789 |
| 3,356,386 | 12/1967 | Taylor | 280/789 |
| 3,734,529 | 5/1973 | Selby | 280/789 |
| 3,967,743 | 7/1976 | Yoder | 280/638 |
| 4,092,050 | 5/1978 | Sobeck | 280/789 |
| 4,488,735 | 12/1984 | Hehr | 280/789 |
| 4,570,967 | 2/1986 | Allnutt | 280/789 |

*Primary Examiner*—Richard A. Bertsch
*Attorney, Agent, or Firm*—Rambo & Rambo

[57] ABSTRACT

Two elongated beams project forwardly and two project rearwardly from a central base portion. The pairs of beams are closer together at their front and rear ends than at the central base portion. Front and rear arms are mounted at opposite ends of the beams for limited rotational movement relative thereto. The cargo consists of a pair of prefabricated building modules, one of which is mounted on the front beams and arm, and the other on the rear beams and arm. When subjected to torsional forces, the front and rear ends of the beams can twist relative to the longitudinal axis of the semitrailer while the front and rear arms remain substantially aligned with the central base portion.

9 Claims, 6 Drawing Figures

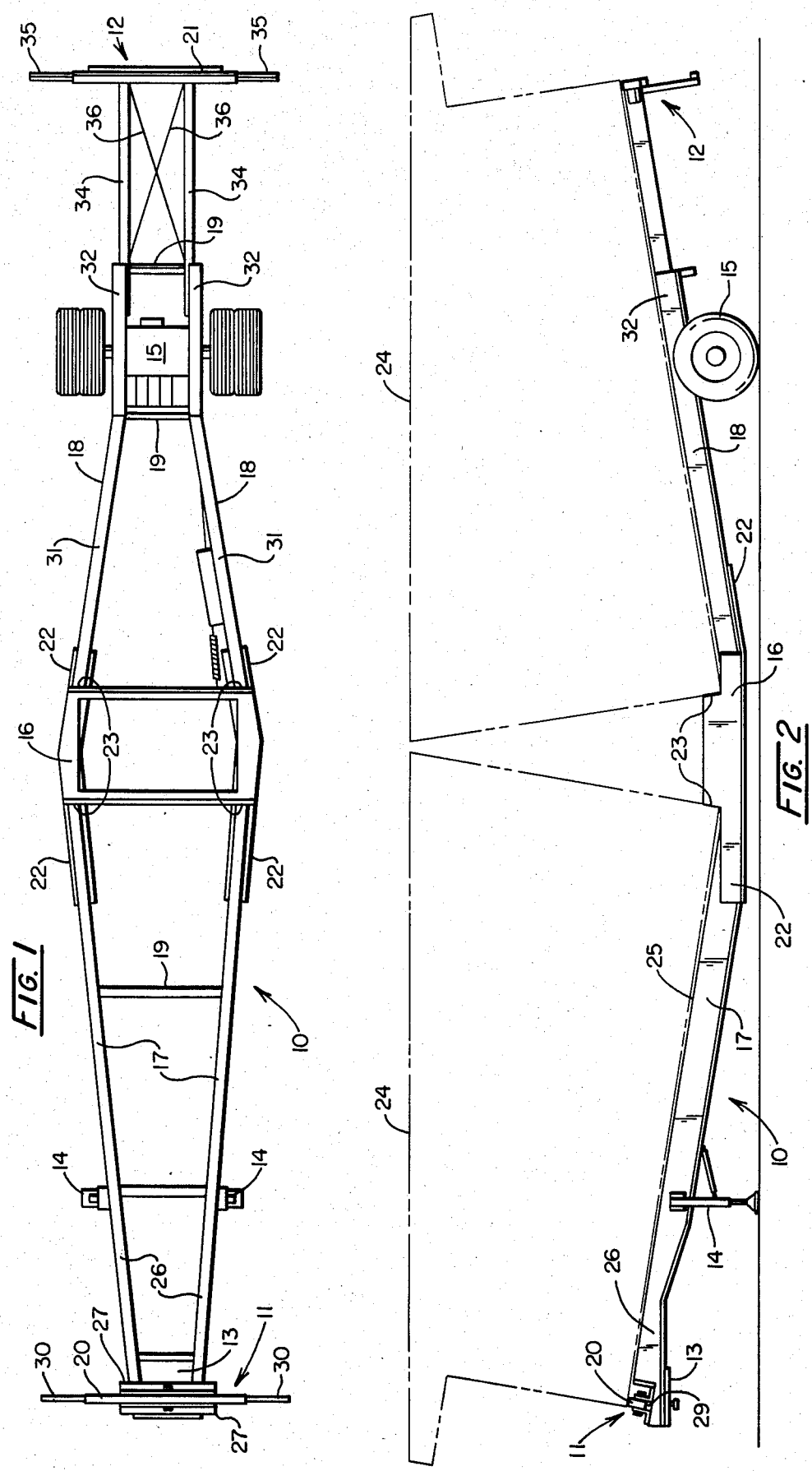

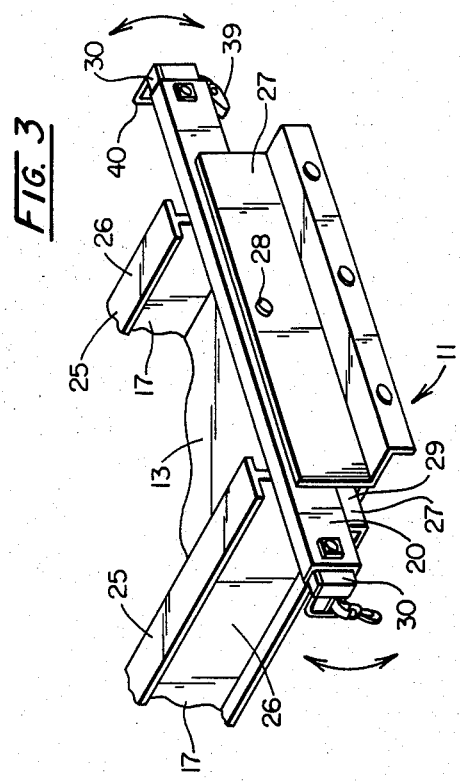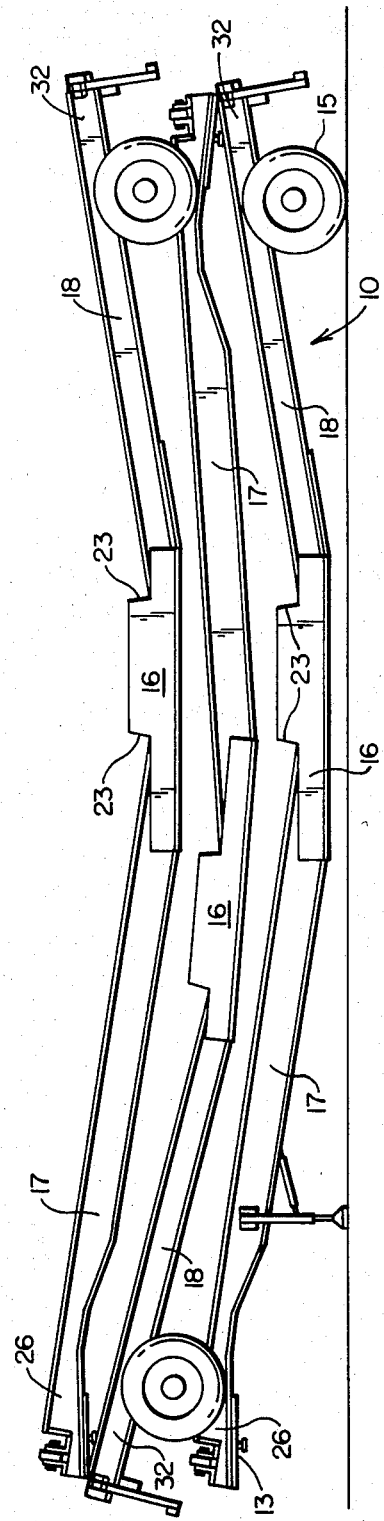

TORSION-ABSORBING HIGHWAY SEMITRAILER

TECHNICAL FIELD

The present invention relates to highway freight transporters or semitrailers equipped with an unenclosed, cargo-supporting bed, and more particularly to those which are provided with means for preventing torsional forces transmitted to the trailer from reaching the cargo.

BACKGROUND ART

Torsional forces are exerted upon the bed or frame of a semitrailer whenever road surface irregularities are encountered in one quadrant of the tractor/trailer assembly, and the irregularity cannot be absorbed entirely by the suspension system in the affected quadrant. If the bump or depression is sufficiently extensive, an upward or downward force will be exerted on that portion of the vehicle's frame to which the overloaded suspension components are attached. Since such an upward or downward movement is substantially perpendicular and lateral to the longitudinal axis of the tractor/semitrailer rig, it creates a twisting or torsional force in the frame, unless offset by some countermovement in another area. For the most part, the fifth wheel device by which the semitrailer is connected to the truck tractor cannot absorb twisting or torsional forces, and thus transmits such forces between the truck and the trailer.

Where, as here, the highway transporter is designed to carry one or more prefabricated building modules, these torsional forces must be stopped before they reach the cargo. Each module is a relatively wide, box-like structure that extends laterally somewhat beyond the sides of the trailer bed, and is thus too large to disperse or fractionate torsional forces without being damaged. Each module is provided with a number of relatively rigid and/or precisely positioned structures, such as brazed pipe connections, finished ceilings and walls, hung windows and doors, and a wide assortment of trim pieces. None of these components would be protected adequately with padding if they were twisted.

There is ample opportunity for torsional forces to arise, due to the course which the tractor/semitrailer assembly must take with the prefabricated building modules. Ordinarily, there are considerable distances between the factories where the modules are manufactured and the construction sites where the modules are assembled together. As a result, the usual road hazards like potholes, soft shoulders, debris and uneven grades and driveway aprons, can cause substantial twisting forces to be exerted on the semitrailer. In addition, the tractor/trailer is frequently driven over rough terrain at the construction site in order to unload the modules directly onto their foundations. Since the module must be anchored securely to the trailer during transit, any twisting motion in the trailer bed is likely to be transmitted to the module, unless diverted or eliminated altogether.

In the past, it was proven to be economically advantageous to build semitrailers that could accommodate two of the prefabricated building modules. These early transporters were provided with crossing steel reinforcing beams extending diagonally between the sides of the trailer bed, and with other reinforcing members that prevented the semitrailer from twisting under almost any road conditions. They were designed, in effect, to transmit torsional forces generated in one quadrant of the tractor/trailer directly to the axle/wheel suspension components at the other corners of the rig. While they functioned adequately for a period of time, their weight created an undesirable load on the truck tractor, and their rigidity created control problems and excessive strain on the fifth wheel device.

The most serious drawback, however, to the early transporters was their inability to accommodate an improved braking system. It was found that in order to provide more braking power, a new air brake and rear axle assembly had to be positioned more rearwardly on the semitrailers than the outmoded equipment had been. Unfortunately, when the earlier trailer was provided with a longer wheelbase and then loaded with two modules, the central portion of the trailer bed sagged. Due to the height of each module and the desirability of providing an inclined bed to urge the modules towards the middle of the trailer, the central portion of the bed was positioned closer to the ground than the opposite ends of the trailer. Accordingly, little or no sag in the central region could be tolerated. In an effort to strengthen this area, additional reinforcement was added. However, by the time it was adequately supported against both sagging and torsional movement, the earlier transporter was too heavy to meet axle weight limits.

By then, it was clear that an entirely new highway transporter was needed. It occurred to the present inventors that, instead of designing another rigid trailer that could not twist under torsional forces, they would try to devise a flexible trailer provided with means for dissipating the torsional movement generated therein before it reached the cargo. As a result, the present invention was conceived.

DISCLOSURE OF THE INVENTION

The present highway semitrailer comprises basically a frame, front and rear stabilizer assemblies, means for hitching the semitrailer to a truck tractor, landing gear means for supporting the semitrailer apart from the truck, and suspension, brake, wheel and road-engaging means. The frame includes a substantially rigid, central base portion, forwardly and rearwardly extending pairs of elongated, cargo-carrying beams projecting from the base portion, and a plurality of relatively spaced apart braces extending transversely between the forward and rear pairs of beams. The forward and rear pairs of beams are closer together at their front and rear ends, respectively, than at the base portion. The front and rear stabilizer assemblies are mounted on the frame adjacent to the front and rear ends, respectively, of the forwardly and rearwardly extending beams. Each of the stabilizer assemblies is provided with a cargo-supporting arm extending laterally in opposite directions beyond the front and rear ends, respectively, of the beams, and each of the supporting arms is capable of limited rotational movement relative to the beams.

Preferably, the cargo-supporting arms on the front and rear stabilizer assemblies and the front and rear ends of the beams are elevated relative to the base portion so that the cargo is inclined towards and abuts against the hub portion. The rear stabilizer assembly includes extensible legs which are slidably mounted against the rear beams, and the supporting arms on the stabilizers are provided with telescoping ends.

A primary object of the present invention is to provide a highway transporter for prefabricated building modules that prevents the modules from being twisted or otherwise affected by torsional forces during travel from factory to construction site. An advantage of the present semitrailer is its ability to be stacked on top of one or more of its kind, once unloaded, and returned to the factory by a single truck tractor. A further object of the present invention is to provide a relatively flexible highway transporter that includes means for dissipating torsional forces. Other advantages of the present semitrailer are its relatively low weight, its ability to accomodate an improved braking system, its improved road handling characteristics, and its improved cargo tie-down apparatus. These and other objects and advantages of the present invention may be more readily perceived in view of the following drawings and description of the preferred embodiment.

BRIEF DESCRIPTION OF THE DRAWINGS

FIG. 1 is a top plan view of a semitrailer according to the present invention and particularly illustrates the manner in which the cargo-supporting arms on the front and rear stabilizer assemblies and the entire rear stabilizer assembly may be extended to receive the cargo;

FIG. 2 is a side elevational view of the present semitrailer and particularly illustrates the preferred manner in which two prefabricated building modules may be mounted thereon;

FIG. 3 is an enlarged perspective view of a front stabilizer assembly according to the present invention with the telescopic ends of the supporting arm retracted;

FIG. 6 is a side elevational view of three of the present semitrailers that have been stacked together, with the rear stabilizer assemblies thereon in relatively retracted positions.

BEST MODE FOR CARRYING OUT THE INVENTION

Figure 4:
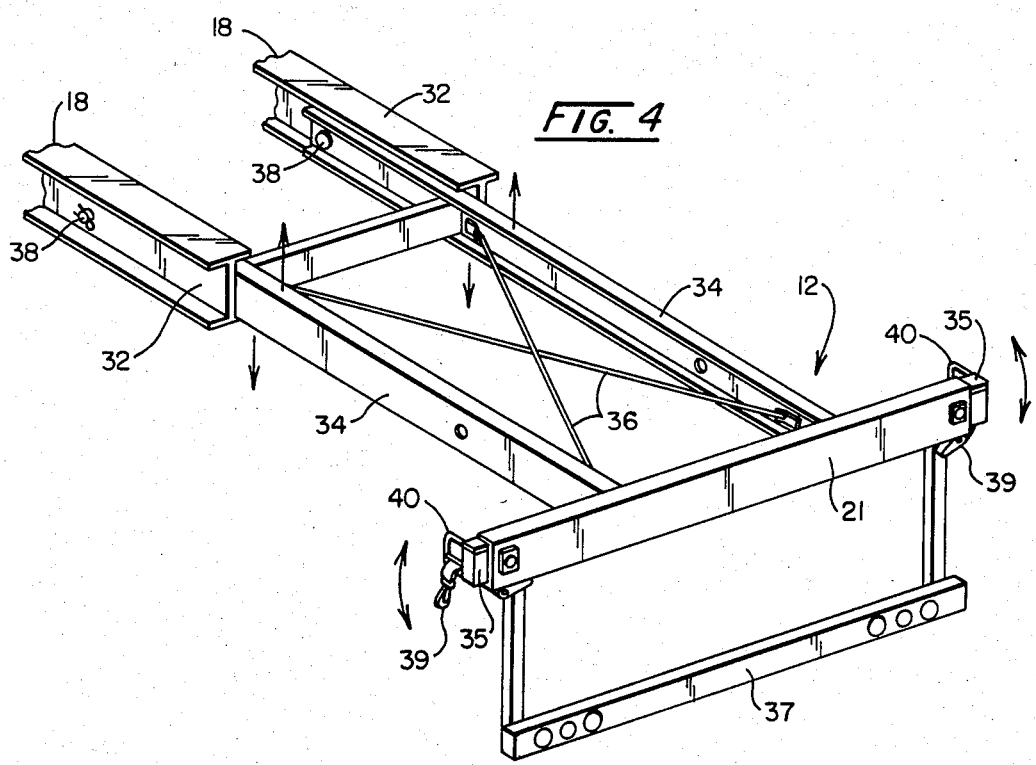
FIG. 4 is an enlarged perspective view of a rear stabilizer assembly according to the present invention, with its extensible legs projecting from the rear beams.

As indicated in FIGS. 1 and 2, the present highway semitrailer is an elongated, unenclosed structure comprising a carriage or frame, generally designated 10; front 11 and rear 12 stabilizer assemblies; a hitch mechanism 13; a pair of landing gear assemblies 14, and rear suspension, brake, wheel and tire assemblies, generally designated 15. The frame 10 includes a central base portion 16, a pair of laterally aligned, longitudinally extending beams 17 projecting forwardly from the base 16, a pair of laterally aligned, longitudinally extending beams 18 projecting rearwardly from the base 16, and a plurality of braces 19 extending transversely between the forward and rear beams 17 and 18. Preferably, the carriage 10 is formed predominantly from I- or H-shaped steel members that are welded together to form the shapes illustrated in the drawings. The front and rear stabilizer assemblies 11 and 12 are each provided with a cargo-carrying arm 20 and 21, respectively, that is disposed transversely to the adjacent pair of beams 17 or 18 and that is disposed for limited rotative or rocking movement relative to said adjacent beams.

The central base portion 16 of the frame 10 is an open, substantially rigid, generally box-like structure that is preferably somewhat narrower than the modules that are carried thereon. The base portion 16 is provided with several reinforcing plates or flanges 22 extending outwardly therefrom in coplanar relation to the forward and rear beams 17 and 18. The reinforcing plates 22, base portion 16 and forward and rear beams 17 and 18 are positioned relative to one another and are welded together in manners well known in the art to prevent the midsection of the carriage 10 from sagging when loaded. In addition, the base portion 16 projects a relatively short distance above the adjoining portions of the beams 17 and 18 to form stops 23 against which the cargo 24 abuts.

Preferably, the forwardly extending beams 17 are approximately the same length as the prefabricated building module 22 that is placed thereon. In addition, the forward beams 17 project from the base portion 16 at somewhat less than a ninety degree angle, thereby providing cargo-carrying surfaces 25 that slope downwardly towards the base 16. In this manner, the modules that are carried thereon are urged constantly against the hub stops 23. Since the cargo-carrying surfaces 25 of said beams are substantially planar, the front ends 26 of the beams 17 are further off the ground than the undersurface of the base 16. In this manner, sufficient space is provided below the conventional hitch assembly 13, which is mounted below the front ends 26 of the beams, for the fifth wheel device on a truck (not shown) to be positioned thereunder. Further elevation of the trailer hitch 13 may also be provided by the conventional retractable landing gears 14 that extend downwardly from the forward beams 17.

As indicated in FIGS. 1 and 3, the front stabilizer assembly 11 is welded or otherwise attached to the front ends 26 of the forward beams 17 and to the trailer hitch assembly 13. Preferably, the front beam ends 26 are formed with ledges across which a pair of L-shaped anchoring brackets 27 are mounted in spaced relation to one another. The front cargo-supporting arm 20 is positioned between the anchoring brackets 27 and is pivotally connected thereto by a bolt or pin 28. The supporting arm 20 is mounted on the anchoring brackets 27 in such a manner that, with the supporting arm in a generally horizontal plane, its upper surface is substantially coplanar with the cargo-carrying front beam surfaces 25, while its undersurface is spaced well above the underlying surfaces of the forward beam ends 26 (FIG. 2). In this manner, the supporting arm 20 is capable of limited rotative movement in a vertical plane relative to the forward beams 17, as indicated by the directional arrows in FIG. 3. Preferably, rotation of the supporting arm is no greater than fifteen degrees in either direction from a horizontal plane. The supporting arm 20 is also provided with opposing, telescoping ends 30 which, even in their relatively extended positions, are somewhat shorter than the building module 24 that is carried thereon.

The frame 10 and front stabilizer assembly 11 are so constructed that, when a torsional force is exerted on the loaded semitrailer, mid to relatively forward portions of the front beams 17 and the front supporting arm 20 will react to it. This torsion-absorbing or dissipating effect is the result of several factors. First, the carriage 10 is constructed so that torsional forces arising therein are directed, in part, to the mid to forward regions of the front beams 17. The length of the beams 17 is considerably greater than the distance therebetween, particularly towards the front ends thereof. In addition, the reinforcing flanges and plates 22 are confined to the more rearward regions of the beams adjacent to the central base portion 16. Second, the cargo-supporting arm 20 and the module 24 are substantially wider than the mid to forward regions of the front beams 17. Finally, the supporting arm 20 is capable of limited rotational movement relative to the beams 17. In combination, these relationships and capabilities permit the mid to forward portions of the beams 17 to twist longitudinally, as a unit, when the semitrailer is placed under torsional strain. In the meantime, the supporting arm 20 and module 24 remain substantially aligned with the base portion 16 and the reinforced, rearward portions of the beams.

When the more flexible portions of the beams 17 twist, the undersurface of the module, in effect, rolls over the relatively higher portion of one of the beams, while separating, temporarily, from the relatively lower portion of the opposing beam. Since the module is substantially unaffected by the rise and fall of the twisting portions of the beams, the four corners of the modules remain substantially coplanar. Likewise, if the base portion 16 is tilted laterally away from a horizontal plane, thereby tilting the end of the module adjacent thereto, the opposite end of the module and the front support arm 20 will tilt in the same direction. Thus, in some instances, the beams twist in response to torsional forces and the supporting arm, module and base portion remain substantially stationary; at other times, the module and supporting arm rock or tilt in response to the positional changes of the central base portion 16.

As indicated in FIGS. 1 and 2, the rearwardly extending pair of beams 18 resemble their forwardly extending counterparts in many respects. The elongated rear beams 18 project longitudinally from the central base portion 16 at less than a ninety degree angle, thereby providing cargo-carrying surfaces 31 that slope downwardly towards the base 16 to urge the cargo against the base stops 23. Since the rear cargo-carrying surfaces 31 are substantially planar, the rear beam ends 32 are further off the ground than the undersurface of the base 16. In this manner, sufficient space is provided for conventional suspension, axle, wheel, air brake and tire assemblies 15 to be positioned below the rear beam ends 32. In addition, the rear beams 18 converge towards one another as they extend towards their rear ends, somewhat as the front beams converge towards their front ends. However, the convergence of the rear beams occurs in the first two-thirds of their lengths, and the beam ends 32 are substantially parallel. In this manner, adequate clearance is provided between the beams 18 and the tires, and the rear stabilizer assembly 12 may be slidably mounted in the rear beam ends 32, as described below.

In contrast to the front beams, the rear beams 18 are substantially shorter than the prefabricated building modules 24. As indicated in FIGS. 2 and 4, however, the rear stabilizer assembly 12 can be extended beyond the rear beam ends 32 sufficiently for the cargo-supporting arm 33 to be disposed directly below the far end of the module 24. This extension is accomplished by means of a pair of relatively spaced apart, parallel, longitudinally extending legs 34 that are slidably mounted on the relatively straight, inboard portions of rear beam ends 32. The legs 24 are welded or otherwise rigidly secured to the rear cargo-supporting arm 21. Like the front supporting arm, the rear arm 21 is provided with telescoping ends 35 that are extended before the module is loaded thereon. In addition to the supporting arm 21 and extensible legs 34, the rear stabilizer assembly 12 preferably includes a pair of diagonally disposed, reinforcing cables 36 attached to opposite ends of the legs 34, a transverse brace 19, and a reflector/crash bar 37.

Each of the extensible legs 34 is smaller than the rear beam end 32 in which it is slidably mounted, so there is a substantial amount of vertical play between these relatively interfitting components. The legs 34 are held in extended and retracted positions on the rear beam ends 32 by pins 38 extending therethrough. Each pin 38 may be readily relocated in at least two spaced apart bores formed in each of the rear beam ends 32. The bores are disposed on the beam ends 32 so that the legs 34 may be locked into either the retracted or extended positions. In addition, the pin-receiving bores in the beam ends 32 and in the legs 34 are disposed along the centerlines of said components, so space is provided between the bottom flanges of the two members, as well as between the top flanges thereof. In this manner, the legs 34 are, as indicated by the directional arrows in FIG. 3, capable of vertically oriented pivotal movement relative to the rear beam ends 32, particularly when the legs are in their extended positions. Since the extensible legs 32 are welded or otherwise rigidly secured to the rear supporting arm 21, said arm 21 is also capable of vertically oriented pivotal movement relative to the rear beam ends 32.

When torsional forces are transmitted to the rearwardly disposed portions of the semitrailer carriage via the tire, wheel and suspension assemblies 19, the rear beams 18, arm 21 and module 24 will react much as their counterparts do on the more forward portions of the trailer. The corners of the module are firmly secured to the extended rear supporting arm ends 35 and to the module-carrying surface 31 of the beams 18 adjacent to the central base 16. Since the supporting arm 21 is capable of limited rotative or rocking movement relative to the longitudinal axis of the trailer and to the rear beam ends 32, the four corners of the module will remain on substantially the same plane, while the rear beam ends 32 are free to twist under the strain of the torsional forces. Since the beam ends 32 are relatively close to the longitudinal axis of the trailer, the module is able to roll over the beams without impeding their twisting motion. Also, if the central base 16 and adjacent corners of the module are tilted laterally for some reason, the rear supporting arm 21 and the trailing corners of the module can do likewise.

Figure 5:
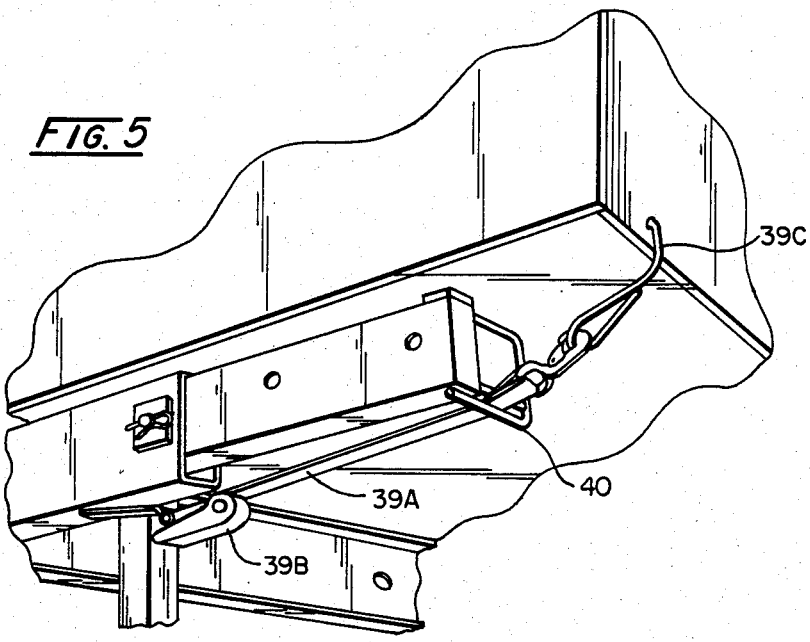
FIG. 5 is a further enlarged perspective view of one telescopic end of the supporting arm on the rear stabilizer assembly and of the preferred tie down apparatus securing one corner of a building module to the supporting arm.

As indicated in FIGS. 3 and 4, each of the front supporting arm ends 30 and rear supporting arm ends 35 is equipped with a tie down mechanism 39 by which the module corners are secured to the trailer. Preferably, additional rigging (not shown) extends between the modules and the front and rear beams 17 and 18 adjacent to the base stops 23 and intermediately of the base portion 16 and beam ends 26 and 32. As indicated in FIG. 5, each of the tie down mechanisms mounted on the ends of the supporting arms 20 and 21 consists of a flexible, reinforced strap 39A, a ratchet mechanism 39B and a generally U-shaped anchor 39C. Preferably, guide bars 40 are welded or otherwise secured to each of the support arm ends 30 and 35, and the tie down straps 39A extend therethrough.

Operation of the present semitrailer is fairly straightforward. First, the ends 30 and 35 of the front and rear cargo-supporting arms 20 and 21, respectively, are extended and locked in place with pins extending through aligned bores in the ends and arms. Likewise, the entire rear stabilizer assembly 12 is extended rearwardly and locked in place with pins 38 projecting through aligned bores in the rear beam ends 32 and the extensible legs 34. A prefabricated building module 24 is then loaded onto the front beams 17, and another is loaded onto the rear beams 18, with relatively adjacent ends of the modules 24 abutting against the central base stops 23. The U-shaped anchors 39C on the tie downs are then inserted into bores provided in the timbers at the base corners of the modules, and the flexible straps 39A are tightened with the ratchet mechanisms 39B. Additional cargo-holding devices are connected to the front beams 17 and adjacent portions of the module 24 mounted thereon, as well as to the rear beams 18 and the module which it carries. A truck tractor is then backed into position so that its fifth wheel device engages the trailer hitch 13, and conventional pneumatic and electrical connections are made between the truck and the present semitrailer. Finally, the feet on the landing gears 14 are raised, and the tractor/trailer rig is prepared to transport the prefabricated building modules.

Once the rig reaches its destination, the modules may be unloaded after the tie down mechanisms 39 and other cargo-holding devices are removed. The front and rear supporting arm ends 30 and 35, respectively, are then retracted and locked in place, as is the rear stabilizer assembly 12. The present semitrailer is then ready to be loaded onto one or more of its kind, secured in place, and transported back to the factory by a single truck tractor. As indicated in FIG. 6, adjacent trailers are stacked in opposite directions in order to provide an even weight distribution.

Thus, it may be seen that the present semitrailer is well adapted for transporting prefabricated building modules and for preventing torsional forces from reaching this cargo. By dissipating or absorbing torsional forces instead of resisting them, the present semitrailer can be lighter, more durable and more stable than heretofore possible.

While a single preferred embodiment of the present invention has been described and illustrated in some detail, numerous modifications, substitutions and additions may be made without departing from the spirit of the invention or the scope of the following claims.

We claim:

1. In a highway semitrailer adapted to carry cargo, that improvement which comprises:
   (a) an elongated frame having a central cargo-supporting base portion, a first pair of laterally spaced apart beams projecting forwardly from the base portion and defining a front end portion of said frame, a second pair of laterally spaced apart beams projecting rearwardly from said base portion and defining a rear end portion of said frame, and at least two braces, each extending laterally between and affixed to one of said first and second pairs of beams;
   (b) a front stabilizer assembly carried on the front end portion of the frame and provided with a laterally extending front cargo-supporting arm disposed for rocking movement in a generally vertical plane perpendicular to the first pair of beams; and
   (c) a rear stabilizer assembly carried on the rear end portion of the frame and provided with a laterally extending rear cargo-supporting arm disposed for rocking movement in a generally vertical plane perpendicular to the second pair of beams.

2. A highway semitrailer according to claim 1, wherein the lateral width of the frame is greater at the central base portion than at the front and rear end portions thereof.

3. A highway semitrailer according to claim 1, wherein each beam of the first and second pairs of beams is provided with an elongated cargo-carrying surface that slopes downwardly toward the central base portion.

4. In a highway semitrailer adapted to carry cargo, that improvement which comprises:
   (a) an elongated frame having a substantially rigid cargo-carrying central base portion, a first pair of laterally spaced apart longitudinally extending beams projecting forwardly from the base portion and defining a front end portion of said frame, a second pair of laterally spaced apart longitudinally extending beams projecting rearwardly from said base portion and defining a rear end portion of said frame, and at least two braces, each extending laterally between and affixed to one of said first and second pairs of beams;
   (b) a front stabilizer assembly carried on the front end portion of the frame and provided with a front cargo-supporting arm extending laterally in opposite directions beyond the first pair of beams, said front arm being pivotally mounted on said stabilizer assembly for rocking movement in a generally vertical plane perpendicular to said first pair of beams; and
   (c) a rear stabilizer assembly including a pair of laterally spaced apart legs, each of said legs being pivotally mounted on one of the second pair of beams, and a rear cargo-supporting arm rigidly secured to said legs rearwardly of said second pair of beams and extending laterally in opposite directions therebeyond, said rear cargo-supporting arm being disposed for limited rocking movement in a generally vertical plane perpendicular to said second pair of beams.

5. A highway semitrailer according to claim 4, wherein each of the front and rear cargo-supporting arms is provided with a telescoping extension slidably mounted in each end thereof.

6. A highway semitrailer according to claim 4, wherein each of the legs of the rear stabilizer assembly is slidably mounted on one of the second pair of beams in generally parallel relation thereto, said rear stabilizer assembly having relatively extended and retracted positions with respect to the rear end portion of said frame.

7. A highway semitrailer according to claim 5, wherein a tie down assembly which includes a flexible strap, a ratchet and a cargo anchor is carried on each telescopic extension mounted on the front and rear cargo-supporting arms.

8. A highway semitrailer according to claim 6, wherein one end of the base portion of the frame, the first pair of beams and the front stabilizer assembly are adapted to collectively receive a first piece of cargo, and an opposite end of said base portion, the second pair of beams and the rear stabilizer assembly are adapted to collectively receive a second piece of cargo, said rear stabilizer assembly being in the relatively extended position.

9. A highway semitrailer according to claim 6, wherein one of said semitrailers is nestable on top of another, said one semitrailer facing in the opposite direction from said other, with the rear stabilizer assemblies of said semitrailers disposed in the relatively retracted positions.

* * * * *